United States Patent
Aydemir et al.

(10) Patent No.: US 6,771,601 B1
(45) Date of Patent: Aug. 3, 2004

(54) NETWORK SWITCH HAVING SOURCE PORT QUEUING AND METHODS, SYSTEMS AND COMPUTER PROGRAM PRODUCTS FOR FLOW LEVEL CONGESTION CONTROL SUITABLE FOR USE WITH A NETWORK SWITCH HAVING SOURCE PORT QUEUING

(75) Inventors: Metin Aydemir, Durham, NC (US); Clark Debs Jeffries, Durham, NC (US); Jeffrey James Lynch, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/494,580

(22) Filed: Jan. 31, 2000

(51) Int. Cl.[7] .................... G01R 31/08; G06F 11/00; G08C 15/00; H04J 1/16; H04J 3/14
(52) U.S. Cl. .................... 370/231; 370/417; 370/236
(58) Field of Search .................... 370/230, 230.1, 370/231, 235, 229, 236, 411–418

(56) References Cited

U.S. PATENT DOCUMENTS

| | | | |
|---|---|---|---|
| 5,768,258 A | * 6/1998 | Van As et al. | 370/236 |
| 5,898,671 A | * 4/1999 | Hunt et al. | 370/235 |
| 5,901,140 A | * 5/1999 | Van As et al. | 370/236 |
| 6,115,356 A | * 9/2000 | Kalkunte et al. | 370/229 |
| 6,122,251 A | * 9/2000 | Shinohara | 370/231 |
| 6,141,346 A | * 10/2000 | Caldara et al. | 370/390 |
| 6,252,849 B1 | * 6/2001 | Rom et al. | 370/230 |

* cited by examiner

*Primary Examiner*—Ajit Patel
*Assistant Examiner*—Yvonne Quy Ha
(74) *Attorney, Agent, or Firm*—Scott W Reid; Myers Bigel Sibley & Sajovec, P.A.

(57) ABSTRACT

A network switch as well as methods, systems and computer program products for controlling congestion at a granularity of less than a link are provided. Such finer granularity may be provided by pausing traffic at a source port level of a network switch. The network switch which transmitted a message which resulted in congestion being detected is notified of the congestion and pauses the communications from the source port of the message while maintaining communications over the link from other source ports. Such source port level congestion control may be provided by a network switch having a sub-queue of its output queues where each sub-queue corresponds to an input port. Source port level pausing of transmissions may then be provided by pausing the sub-queue associated with a source port.

25 Claims, 3 Drawing Sheets

| PRE | S of F Del. | DA | SA | MAC "88-08" | Pause CMD | PARMS (Time Value) | Pad (Stream Indicator) | FCS |
|---|---|---|---|---|---|---|---|---|
| 7 | 1 | 6 | 6 | 2 | 2 | 2 | | 4 |

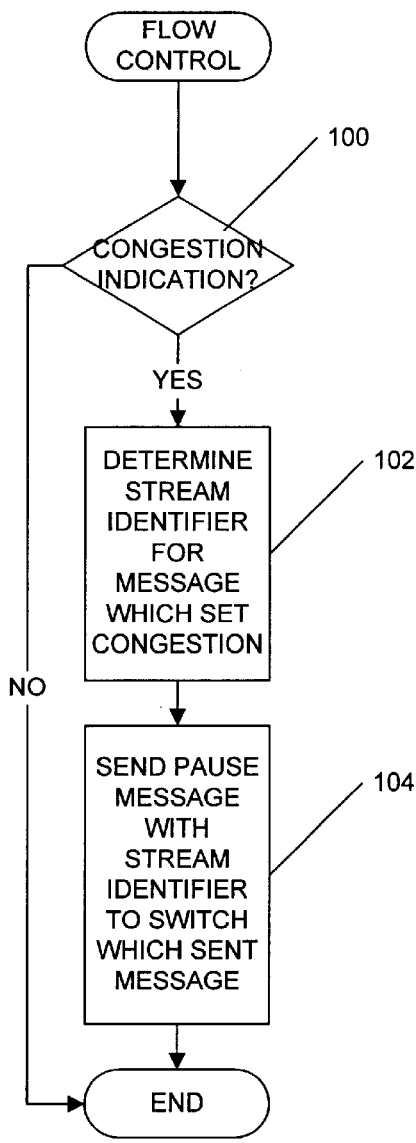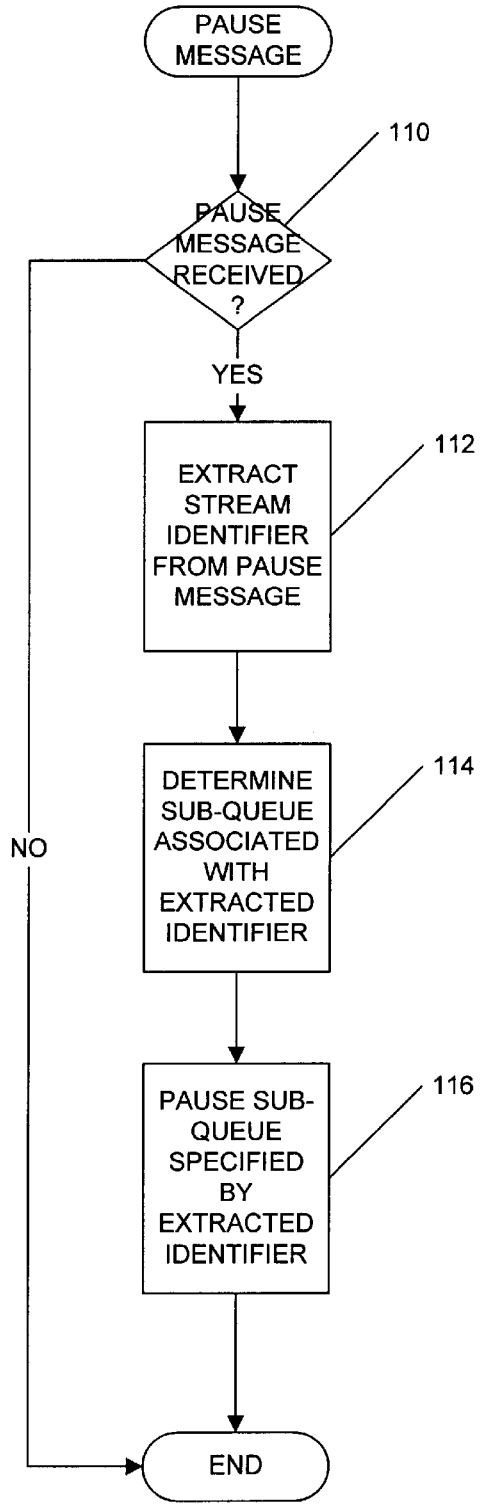
Figure 4
Figure 5

NETWORK SWITCH HAVING SOURCE PORT QUEUING AND METHODS, SYSTEMS AND COMPUTER PROGRAM PRODUCTS FOR FLOW LEVEL CONGESTION CONTROL SUITABLE FOR USE WITH A NETWORK SWITCH HAVING SOURCE PORT QUEUING

FIELD OF THE INVENTION

The present invention relates to network communications and more particularly to congestion control in network communications.

BACKGROUND OF THE INVENTION

In conventional networks, the rate of communications between network nodes, such as network switches, may be controlled so as to avoid congestion within the network which may reduce network throughput to unacceptable levels. Typically, congestion control mechanisms measure queue occupancy at a network node and utilize one or more occupancy thresholds which, if exceeded, can result in reducing the rate at which communications are received by a network node. Such congestion mechanisms have typically reduced data rates into the node experiencing congestion by pausing communications on a link into the node. When the incoming communications for a link have been paused, the outgoing communications may continue so as to reduce the queue occupancy at the node and, thereby, remove the congestion condition.

For example, if a network switch having N inputs and at least one output receives communications for the output from three of the N inputs, then, if a congestion condition is detected for the output, one or more of the three links would typically be paused to alleviate the congestion condition. In a link level congestion control system, the link associated with the input port which received the communication which resulted in the congestion condition would typically be paused for a predefined time period. One such link level congestion control system is provided by the Institute of Electrical and Electronics Engineers (IEEE) 802.3x specification which provides flow control through a pause message.

While link level flow control may avoid performance degrading congestion, such congestion control may also unnecessarily reduce throughput as pausing an entire link may overly restrict throughput. Accordingly, a need exists for improvements in network switches which may allow for improvements in congestion control in communications between network switches.

SUMMARY OF THE INVENTION

In light of the above discussion, the present invention may provide a network switch as well as methods, systems and computer program products for controlling congestion at a granularity of less than a link. Such finer granularity may be provided by pausing traffic at a source port level of a network switch. The network switch which transmitted a message which resulted in congestion being detected is notified of the congestion and pauses the communications from the source port of the message while maintaining communications over the link from other source ports. Such source port level congestion control may be provided by a network switch having a sub-queue of its output queues where each sub-queue corresponds to an input port. Source port level pausing of transmissions may then be provided by pausing the sub-queue associated with a source port.

In a particular embodiment of the present invention, flow control through a first network switch having a plurality of input ports and a plurality of output ports may be provided by receiving a message for transmission from an input port of the first network switch to an output port of the first network switch and determining if the received message results in an indication of congestion associated with transmitting the received message onto the output port. The transmission of messages received at a first input port on a second network switch which transmitted the message may then be paused while the second network switch continues to transmit messages received at input ports of the second network switch other than the first input port if the received message results in an indication of congestion.

In a further embodiment of the present invention, the transmission of messages received at a first input port on a second network switch may be paused by transmitting a pause message from the first network switch to the second network switch which specifies a source and/or destination address of the received message. The transmission of messages from the input port of the second network device associated with the source and/or destination address specified in the pause message may then be paused while continuing to transmit messages to the first network switch from input ports of the second network switch which are not associated with the source and/or destination address specified in the pause message.

In still another embodiment of the present invention, an output queue of the second network switch is associated with the output port over which the message received by the first network switch was transmitted. In such an embodiment, transmission of messages from the input port of the second network switch associated with the source and/or destination address specified in the pause message may be accomplished by dividing the output queue of the second network switch into a plurality of sub-queues, wherein each sub-queue corresponds to one of a plurality of input ports which receive messages for transmission on the output port of the second network switch. Messages received for transmission on the output port of the second network switch are stored in one of the plurality of sub-queues based on the input port from which the message was received. The sub-queue corresponding to the source and/or destination address specified in the pause message may then be determined so as to determine a paused sub-queue and transmission of messages in the paused sub-queue on the output port of the second network switch may be paused while continuing to transmit messages from sub-queues of the output port which are not paused.

In a still further embodiment of the present invention, the sub-queue corresponding to the source and/or destination address specified in the pause message may be determined by establishing a look-up table which relates source and/or destination addresses to source ports of the second network switch. The source and/or destination address associated with the input port of the second network switch to be paused may be extracted from the pause message and the input port to be paused identified utilizing the extracted source and/or destination address and the look-up table.

In specific embodiments of the present invention, the pause message specifies a duration during which messages from the input port of the second network device are paused.

Alternatively, the pause message may specify that messages from the input port of the second network device are paused until a resume message is received by the second network device. In such an embodiment, it may be determined if the congestion condition no longer exists. If so, a resume message may be sent from the first network switch to the second network switch so as to resume transmission of messages from the input port of the second network switch to the first network switch.

In a specific embodiment of the present invention, the pause message is an IEEE 802.3x link level flow control message. Furthermore, the link level flow control message may be a pause frame. In such an embodiment, the pad portion of the pause frame may include at least one of a source and a destination address.

A network switch according to the present invention includes a plurality of input ports and at least one output port. An output queue associated with the output port receives data from the plurality of input ports and provides data to the output port and a plurality of sub-queues of the output queue are also provided. Each of the plurality of sub-queues is associated with a respective one of the plurality of input ports so as to receive data from the associated respective one of the plurality of input ports.

The plurality of sub-queues may be configured so as to be separately paused so that one of sub-queues may be prevented from providing data to the output port irrespective of whether others of the plurality of sub-queues provide data to the output port. The plurality of sub-queues may also be configured so as to receive data from their respective input port irrespective of whether the sub-queue is paused. Furthermore, the output port may be configured so as to receive pause messages which specify an input port and further configured to pause a corresponding one of the sub-queues associated with an input port specified in a received pause message.

While the invention has been described above primarily with respect to the method aspects of the invention, both systems and/or computer program products are also provided.

BRIEF DESCRIPTION OF THE DRAWINGS

FIG. 4 is a flowchart illustrating operations of a network switch according to an embodiment of the present invention when congestion is detected; and FIG. 5 is a flowchart illustrating operations of a network switch upon receiving a pause message according to an embodiment of the present invention.

DETAILED DESCRIPTION OF PREFERRED EMBODIMENTS

Figure 1:
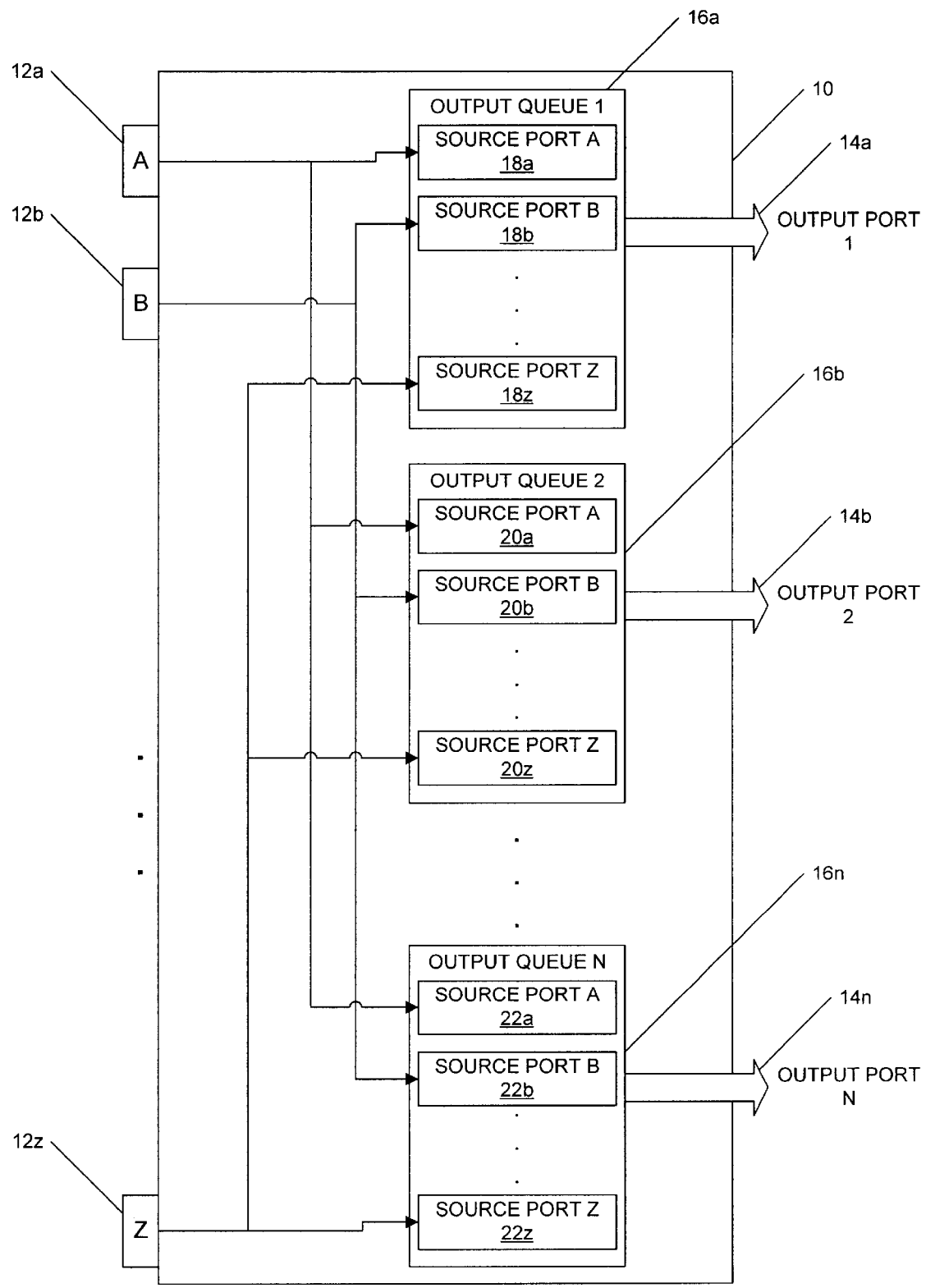
FIG. 1 is a block diagram of a network switch according to one embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention can be embodied as systems, methods, and/or a computer program products for congestion control in a network. As will be appreciated by those of skill in the art, the present invention can take the form of an entirely hardware embodiment, an entirely software (including firmware, resident software, micro-code, etc.) embodiment, or an embodiment containing both software and hardware aspects. Furthermore, the present invention can take the form of a computer program product on a computer-usable or computer-readable storage medium having computer-usable or computer-readable program code means embodied in the medium for use by or in connection with an instruction execution system. In the context of this document, a computer-usable or computer-readable medium can be any means that can contain, store, communicate, propagate, or transport the program for use by or in connection with the instruction execution system, apparatus, or device.

The computer-usable or computer-readable medium can be, for example, but is not limited to, an electronic, magnetic, optical, electromagnetic, infrared, or semiconductor system, apparatus, device, or propagation medium. More specific examples (a nonexhaustive list) of computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner if necessary, and then stored in a computer memory.

The present invention is described below with reference to flowchart illustrations and/or block diagrams of methods, apparatus (systems) and computer program products according to an embodiment of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

As is described in more detail below, the present invention provides for the control of communications between network switches so as to provide congestion control at a granularity of less than a link. Thus, the present invention may provide for pausing communications over a link to a network switch which originate from a particular source port of the network switch transmitting over the network link. Such source port level congestion control may be provided by providing sub-queues within an output queue of a network switch where the sub-queues are associated with a particular source port. Communications on the network link which originate from a particular source port may then be paused and queued in the corresponding sub-queue while other communications in the output queue are transmitted over the link. Thus, congestion control may be provided without necessitating that an entire link be paused. Such finer granularity may provide for improved throughput as a congestion control mechanism may fine tune the amount of communications which are paused to overcome a detected congestion condition.

FIG. 1 illustrates a network switch 10 according to an embodiment of the present invention. As seen in FIG. 1, the network switch includes a plurality of input ports A through Z (12a through 12z). The input ports 12a–12z connect to network links and receive communications to be routed to a plurality of output ports including the output ports 1 through N (14a through 14n). Each of the output ports 1 through N, 14a–14n, has associated with it an output queue 16a through 16n. The output queues 16a–16n receive data from the input ports 12a–12z and supply data to the output ports 14a–14n.

As is seen in FIG. 1, data from any of the input ports 12a–12z may be routed to any of the output ports 14a–14n and, therefore, each of the input ports may supply data to the output queues 16a–16n. However, as is further seen in FIG. 1, each of the output queues 16a–16n is subdivided into sub-queues 18a–18z, 20a–20z and 22a–22z. The number of sub-queues in an output queue 16a–16n preferably corresponds to the number of input ports 14a–14z in the network switch 10 such that each of the input ports 14a–14z provides data to a corresponding one of the sub-queues 18a–18z, 20a–20z or 22a–22z of the output queues 16a–16n. However, groups of input ports may be represented by a single output queue and more than one output queue may represent a single output port.

As an example, data received on the input port A 12a and to be transmitted on the output port 1 14a would be queued in sub-queue 18a of output queue 16a which corresponds to the input port A 12a as the source port of the data. Similarly, data received on the input port B 12b and to be transmitted on the output port 1 14a would be queued in sub-queue 18b of output queue 16a which corresponds to the input port B 12b as the source port of the data. Furthermore, data received on the input port Z 12z and to be transmitted on the output port 1 14a would be queued in sub-queue 18z of output queue 16a which corresponds to the input port Z 12z as the source port of the data. Data received on the input port A 12a and to be transmitted on the output port 2 14b would be queued in sub-queue 20a of output queue 16b which corresponds to the input port A 12a as the source port of the data. Data received on the input port B 12b and to be transmitted on the output port 2 14b would be queued in sub-queue 20b of output queue 16b which corresponds to the input port B 12b as the source port of the data. Furthermore, data received on the input port Z 12z and to be transmitted on the output port 2 14b would be queued in sub-queue 20z of output queue 16b which corresponds to the input port Z 12z as the source port of the data.

In providing data from the sub-queues 18a–18z, 20a–20z and 22a–22z to the output ports 14a–14n, data may be taken from the sub-queues 18a–18z, 20a–20z and 22a–22z in a round-robin fashion such that data from each of the sub-queues 18a–18z, 20a–20z and 22a–22z of an output queue 16a–16n is transmitted on the corresponding output ports 14a–14n in a rotating manner. The precise mechanism of the rotation may vary from system to system and may, for example, take into account priority or bandwidth guarantees associated with data to be transmitted and thus, a weighted round-robin mechanism may be utilized. Furthermore, each of the sub-queues 18a–18z, 20a–20z and 22a–22z may be paused by skipping a particular one of the sub-queues 18a–18z, 20a–20z and 22a–22z in the round-robin sequence. As will be appreciated by those of skill in the art, various conventional mechanisms for scheduling data from the sub-queues 18a–18z, 20a–20z and 22a–22z to be transmitted to the output ports 14a–14n may be utilized while still benefitting from the teachings of the present invention. Thus, through the utilization of the queuing structure illustrated in FIG. 1, the sub-queues 18a–18z, 20a–20z and 22a–22z may be individually paused.

Accordingly, the network switch 10 allows for the separate queuing of data in an output queue based on the input port (i.e. the source port) over which the data is received. As described below, such a separation of output queues 16a–16n into the sub-queues 18a–18z, 20a–20z and 22a–22z may allow for finer granularity in congestion control such that source port level congestion control may be utilized to reduce the amount of communication traffic flowing over a communication link without completely stopping the traffic flowing over the communication link.

Figures 2, 3:
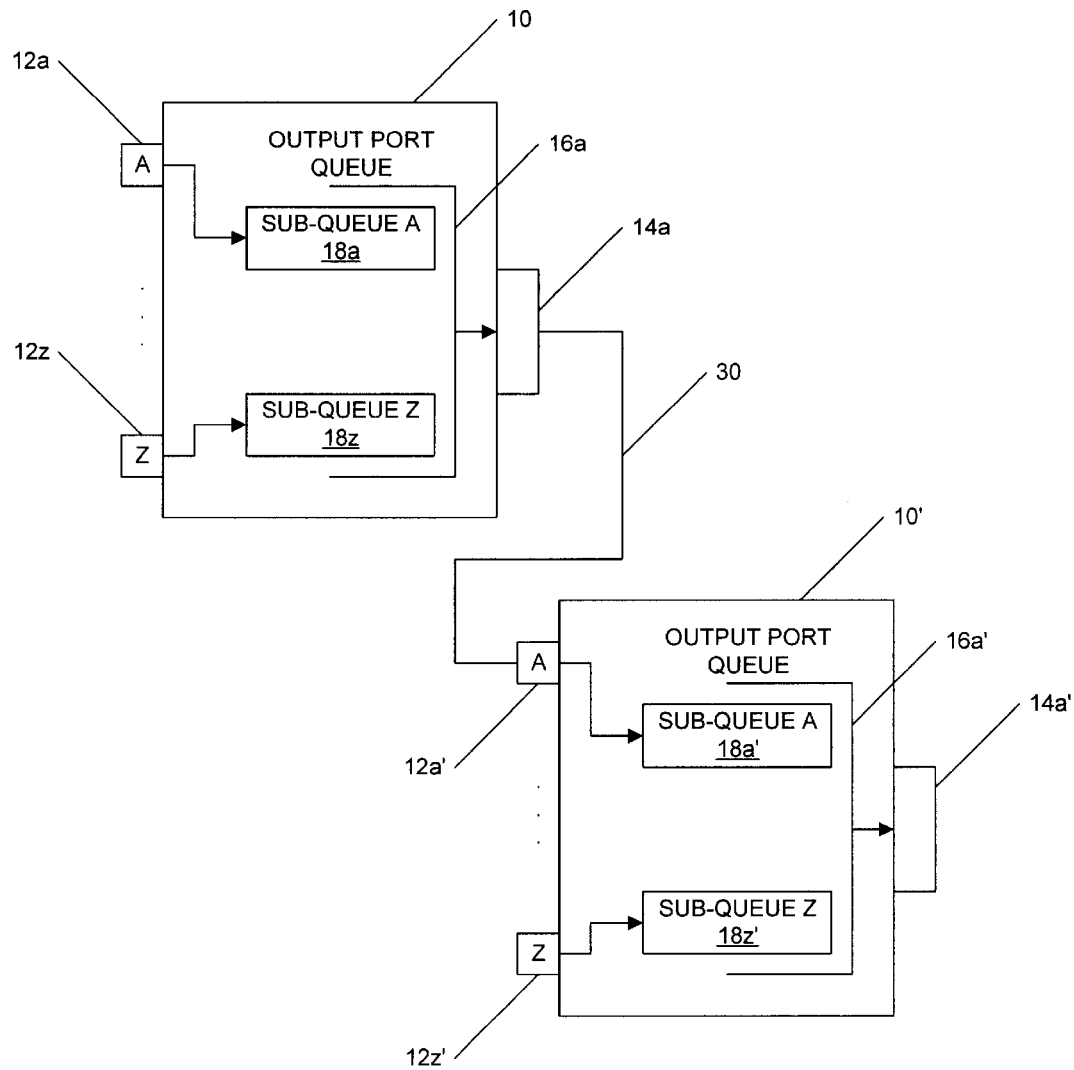
FIG. 2 is a block diagram of a network configuration utilizing one embodiment of the present invention.
FIG. 3 is a diagram of a pause message suitable for use with the present invention.

FIG. 2 illustrates a network connection incorporating the network switch 10 to provide source port level flow control. Illustrated in FIG. 2 are two network switches 10 and 10' connected by communication link 30. The network switches 10 and 10' may be of the same or a different configuration, however, each should be capable of carrying out the operations described herein for congestion control. The network switches 10 and 10' are illustrated in FIG. 2 as of the same configuration and, accordingly, corresponding aspects of network switch 10 are indicated in network switch 10' by a prime indicator in the reference number.

Communication link 30 connects an output port 14a of the network switch 10 with an input port A 12a' of the network switch 10'. As described above, data received from the input ports 12a–12z to be transmitted on the output port 14a is queued in the corresponding sub-queue 18a–18z based on the input port 12a–12z from which the data was received. Data from the sub-queues 18a–18z is transmitted via output port 14a and communication link 30 to input port 12a' of network switch 10'. Network switch 10' may then queue the received data it its own output queue 16a' and, preferably, a corresponding sub-queue 18a' of output queue 16a'.

While the above operations of the network switches 10 and 10' may be carried out during normal operations, in the event of the detection of congestion, the operations of FIGS. 4 and 5 may be carried out to pause data from a input port 12a–12z of the network switch 10 so as to alleviate a congestion condition at the network switch 10'. Preferably, if the network switch 10' detects congestion associated with the output queue 16a' as a result of data transmitted over communication link 30 and arriving at the input port A 12a', then the network switch 10' transmits a pause message over communication link 30 to the network switch 10. The pause message specifies a stream identifier associated with the data which resulted in the detection of the congestion condition. The network switch 10 receives the pause message and pauses the sub-queue of output queue 16a which corresponds to the stream identifier specified in the pause message. In an IEEE 802.3x embodiment of the present invention, a pause message of the format illustrated in FIG. 3 may be utilized.

A seen in FIG. 3, an IEEE 802.3pause message may be modified according to the present invention by providing a stream indicator in the pad portion of the message. The stream indicator may act as a stream identifier from which the receiving network switch 10 may determine the sub-queue to pause. Thus, preferably, the stream indicator includes a source and/or destination media access controller (MAC) address of a message which resulted in the congestion condition. A source port associated with the source and/or destination address may be determined and the sub-queue associated with the source port identified by the stream identifier paused. A priority level could also be incorporated into the stream indicator so as to prioritize which sub-queues are paused in the event that multiple sub-queues are paused. For example, a further embodiment of the present invention might further partition traffic in sub-queues into sub-sub-queues of traffic of the same priority. Priority may be defined in terms of Internet Engineering Task Force (IETF) concepts in Differentiated Services or other priority mechanisms known to those of skill in the art.

Returning to FIG. 4, operations of switch 10' will now be described. As seen in block 100, if the network switch 10' detects congestion associated with the output port 14a', the network switch 10' determines the stream identifier of the data frame which resulted in the congestion condition (block 102). Suitable methods of determining if a congestion condition has occurred are known to those of skill in the art and, therefore, will not be described further herein. However, congestion tests may also be applied to the sub-queues of the present invention so as to prevent a sub-queue which is paused from resulting in a subsequent congestion problem at the network switch 10 which paused the sub-queue. However, if a congestion condition results at network switch 10, then the operations may be carried out as described below so that the amount of communications from the link associated with the queue or sub-queue which experiences a congestion condition may be reduced. Thus, the present invention may provide for reductions in traffic flow only through network switches which experience congestion conditions and these reductions may only propagate back to a point where a congestion condition no longer exists. Accordingly, the present invention may provide congestion control with limited impact on the overall network performance.

The determination of the stream identifier may be carried out by extracting the source and/or destination MAC address from the frame which resulted in the congestion condition. This stream identifier is then incorporated into a pause message and the pause message transmitted from the network switch 10' which detected the congestion condition to the network switch 10 which sent the frame which resulted in the congestion condition (block 104). If no congestion condition occurs, then the network switch 10' need not carry out the operations of blocks 102 and 104 (block 100).

FIG. 5 illustrates the operations of the network switch 10 upon receipt of the pause message from the network switch 10'. If a pause message is received (block 110), then the network switch 10 extracts the stream identifier from the pause message (block 112). As described above, this extraction may be carried out by evaluating a field in the pause message which specifies the source and/or destination MAC address of the frame which resulted in the congestion condition. The network switch 10 utilizes the extracted stream identifier to determine the sub-queue specified by the stream identifier (block 114). This determination may be made by maintaining a look-up table of unique source MAC addresses of all frames processed through each the output sub-queues 18a–18z. For example, a forwarding table which is maintained by each output port to direct traffic in the reverse-direction may be utilized. Utilizing the extracted address information, the output sub-queue associated with the address could be determined from the forwarding table to identify the sub-queue associated with the message which resulted in the congestion condition.

After determining the sub-queue specified by the stream identifier, the network switch 10 pauses that sub-queue (block 116). Thus, for example, if a frame from the input port A 12a of the network switch 10 resulted in congestion at the network switch 10', then sub-queue 18a would be paused. A sub-queue may be paused for a predetermined duration, for a duration specified in the pause message or until a subsequent resume message is received to restart the paused sub-queue. If the congestion condition persists, then the same or a different sub-queue may be paused. Similarly, a resume message may be transmitted if it is determined that the congestion condition no longer exists.

In a further embodiment of the present invention, a receiving switch can direct a sending switch to pause transmission of data, possibly in the context of IEEE 802.3 flow control. The pause might be organized as a fraction of an interval among periodic intervals. Thus, there may be a fixed time interval, Dt, and some fraction, pi(t), of each interval Dt the sending switch must pause sending. Here pi(t) denotes the fraction of time (e.g. a fraction of Dt) to pause during the interval of time from time t to time t+Dt. The pause fraction may be calculated at the end of every time interval Dt and held constant for the subsequent time interval from time t to time t+Dt. In the event that a sub-queue is paused for a duration specified in the pause message, then the next value of the pause duration, namely pi(t+Dt) might be calculated as a function of sub-queue length, the sum of some or all sub-queue lengths, the present value pi(t) of the pause fraction, or other previous values of the pause fraction such as the previous value pi(t−Dt). For example, such a calculation of the next pause fraction pi(t+Dt) for sub-queue i might be:

$$pi(t+Dt)=0 \text{ if } qi(t)<=T,$$

else $$(1-k1)*pi(t)+k1*Fi(t)/Li$$

where qi(t) is a queue occupancy at time t, the threshold T is a queue occupancy level associated with congestion, k1 is a constant between 0 and 1, Li is the capacity of the link from the source port to the destination port and Fi(t) is the total offered flow over the link during the just completed time interval from t−Dt to t.

As a second example of pause fraction determination, another embodiment of the present invention may specify the pause fraction as:

$$pi(t+Dt)=0 \text{ if } qi(t)<=T,$$

else $$2*pi(t)-pi(t-Dt)-k2^2*(pi(t-Dt)-(1-Fi(t-Dt)/Li))-2*k2* (pi(t)-pi(t-Dt))$$

where pi(t), qi(t), T, t, t+Dt, and Li are as described above and where K2 is a constant between 0 an 1, pi(t−Dt) is the previous value of the pause fraction and Fi(t−Dt) is the previous value of the total offered flow over the link during the time interval from t−Dt to t. While two examples of the determination of a pause fraction, as will be appreciated by those of skill in the art, other determinations of the pause fraction may be utilized.

Simulations of the above-described source-port level congestion control and link level congestion control have been carried out for a 10 second time interval with an 85% traffic load and a 500 Kbyte congestion threshold for output port queues. Performance of the congestion control was measured in terms of control of buffer occupancy and link throughput. The maximum buffer occupancy results indicated that both link level and source port level congestion control managed to control buffer occupancy. Furthermore, the source port level congestion control achieved a 13% improvement in throughput over the link level congestion control.

While the present invention has been described with reference to network switches, as will be appreciated by those of skill in the art, the present invention may be applied to any network device have multiple input ports which are multiplexed onto an output port. Accordingly, as used herein, the term network switch refers to a network device which receives data at multiple input ports and provides that data to an output port for transmission over a communication link. Thus, the present invention may include in the term network switch, devices such as routers or the like.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method of flow control through a first network switch having a plurality of input ports and a plurality of output ports, the method comprising:

receiving a message for transmission from an input port of the first network switch to an output port of the first network switch;

determining if the received message results in an indication of congestion associated with transmitting the received message onto the output port; and pausing the transmission of messages received at a first input port on a second network switch which transmitted the received message using an output queue associated with an output port of the second network switch over which the received message was transmitted to the input port of the first network switch which received the message if the received message results in an indication of congestion; wherein said pausing the transmission comprises:

transmitting a pause message from the first network switch to the second network switch which specifies a source and/or destination address of the received message;

dividing the output queue of the second network switch into a plurality of sub-queues, wherein each sub-queue corresponds to one of a plurality of input ports which receive messages for transmission on the output port of the second network switch;

storing messages received for transmission on the output port of the second network switch into one of the plurality of sub-queues based on the input port from which the message was received;

determining the sub-queue corresponding to the source and/or destination address specified in the pause message so as to determine a paused sub-queue; and, pausing transmission of messages in the paused sub-queue on the output port of the second network switch while continuing to transmit messages from at least one sub-queue of the output port which is not paused.

2. A method according to claim 1, wherein the step of determining the sub-queue corresponding to the source and/or destination address specified in the pause message comprises the steps of:

establishing a look-up table which relates source and/or destination addresses to source ports of the second network switch;

extracting from the pause message the source and/or destination address associated with the input port of the second network switch to be paused; and identifying the input port to be paused utilizing the extracted source and/or destination address and the look-up table.

3. A method according to claim 1, wherein the pause message specifies a duration during which messages from the input port of the second network switch are paused.

4. A method according to claim 1, wherein the pause message specifies that messages from the input port of the second network switch are paused until a resume message is received by the second network switch.

5. A method according to claim 4, further comprising the steps of:
   determining if the congestion condition no longer exists; and
   sending a resume message from the first network switch to the second network switch so as to resume transmission of messages from the input port of the second network switch to the first network switch.

6. A method according to claim 1, wherein the pause message is an IEEE 802.3x link level flow control message.

7. A method according to claim 6, wherein the link level flow control message comprises a pause frame.

8. A method according to claim 7, wherein a pad portion of the pause frame includes at least one of a source and a destination address.

9. A system for flow control through a first network switch having a plurality of input ports and a plurality of output ports, comprising:
   means for receiving a message for transmission from an input port of the first network switch to an output port of the first network switch;
   means for determining if the received message results in an indication of congestion associated with transmitting the received message onto the output port; and
   means for pausing the transmission of messages received at a first input port on a second network switch which transmitted the received message using an output queue associated with an output port of the second network switch over which the received message was transmitted to the input port of the first network switch which received the message if the received message results in an indication of congestion; wherein said means for pausing comprises:
      means for transmitting a pause message from the first network switch to the second network switch which specific, a source and/or destination address of the received message;
      means for dividing the output queue of the second network switch into a plurality of sub-queues, wherein each sub-queue corresponds to one of a plurality of input ports which receive messages for transmission on the output port of the second network switch;
      means for storing messages received for transmission on the output port of the second network switch into a one of the plurality of sub-queues based on the input port from which the message was received;
      means for determining the sub-queue corresponding to the source and/or destination address specified in the pause message so as to determine a paused sub-queue; and
      means for pausing transmission of messages in the paused sub-queue on the output port of the second network switch while continuing to transmit messages from at least one sub-queue of the output port which is not paused.

10. A system according to claim 9, wherein the means for determining the sub-queue corresponding to the source and/or destination address specified in the pause message comprises:
   means for establishing a look-up table which relates source and/or destination addresses to source ports of the second network switch;
   means for extracting from the pause message the source and/or destination address associated with the input port of the second network switch to be paused; and
   means for identifying the input port to be paused utilizing the extracted source and/or destination address and the look-up table.

11. A system according to claim 9, wherein the pause message specifies a duration during which messages from the input port of the second network switch are paused.

12. A system according to claim 9, wherein the pause message specifies that messages from the input port of the second network switch are paused until a resume message is received by the second network switch.

13. A system according to claim 12, further comprising:
   means for determining if the congestion condition no longer exists; and
   means for sending a resume message from the first network switch to the second network switch so as to resume transmission of messages from the input port of the second network switch to the first network switch.

14. A system according to claim 9, wherein the pause message is an IEEE 802.3x link level flow control message.

15. A system according to claim 14, wherein the link level flow control message comprises a pause frame.

16. A system according to claim 15, wherein a pad portion of the pause frame includes at least one of a source and a destination address.

17. A computer program product for flow control through a first network switch having a plurality of input ports and a plurality of output pores, comprising:
   a computer-readable storage medium having computer readable program code embodied in said medium, said computer-readable program code comprising:
   computer readable program code which receives a message for transmission from an input port of the first network switch to an output port of the first network switch;
   computer readable program code which determines if the received message results in an indication of congestion associated with transmitting the received message onto the output port; and
   computer readable program code which pauses the transmission of messages received at a first input port on a second network switch which transmitted the received message using an output queue associated with an output port of the second network switch over which the received message was transmitted to the input port of the first network switch which received the message if the received message results in an indication of congestion; wherein said computer readable program code which pauses the transmission further comprises:
      computer readable program code which transmits a pause message from the first network switch to the second network switch which specifies a source and/or destination address of the received message;
      computer readable program code which divides the output queue of the second network switch into a plurality of sub-queues, wherein each sub-queue corresponds to one of a plurality of input ports which receive messages for transmission on the output port of the second network switch;

computer readable program code which stores messages received for transmission on the output port of the second network switch into a one of the plurality of sub-queues based on the input port from which the message was received;

computer readable program code which determines the sub-queue corresponding to the source and/or destination address specified in the pause message so as to determine a paused sub-queue; and, computer readable program code which pauses transmission of messages in the paused sub-queue on the output port of the second network switch while continuing to transmit messages from at least one sub-queue of the output port which is not paused.

18. A computer program product according to claim 17, wherein the computer readable program code which determines the sub-queue corresponding to the source and/or destination address specified in the pause message comprises:

computer readable program code which establishes a look-up table which relates source and/or destination addresses to source ports of the second network switch;

computer readable program code which extracts from the pause message the source and/or destination address associated with the input port of the second network switch to be paused; and computer readable program code which identifies the input port to be paused utilizing the extracted source and/or destination address and the look-up table.

19. A computer program product according to claim 17, wherein the pause message specifies a duration during which messages from the input port of the second network switch are paused.

20. A computer program product according to claim 17, wherein the pause message specifies that messages from the input port of the second network switch are paused until a resume message is received by the second network switch.

21. A computer program product according to claim 20, further comprising:

computer readable program code which determines if the congestion condition no longer exists; and computer readable program code which sends a resume message from the first network switch to the second network switch so as to resume transmission of messages from the input port of the second network switch to the first network switch.

22. A computer program product according to claim 17, wherein the pause message is an IEEE 802.3x link level flow control message.

23. A computer program product according to claim 22, wherein the link level flow control message comprises a pause frame.

24. A computer program product according to claim 23, wherein a pad portion of the pause frame includes at least one of a source and a destination address.

25. A network switch comprising:

a plurality of input ports;

at least one output port;

an output queue associated with the output port which receives data from the plurality of input ports and provides data to the output port; and a plurality of sub-queues of the output queue, wherein each of the plurality of sub-queues is associated with a respective one of the plurality of input ports so as to receive data from the associated respective one of the plurality of input ports and wherein; the output port is configured so as to receive pause messages specifying an input port and is further configured to, in response to receipt of such a pause message, pause the sub-queue of the output queue corresponding to the input port specified in the pause message while continuing to process data to the output port from the remaining input ports via the remaining sub-queues.

* * * * *